(12) United States Patent
Guo et al.

(10) Patent No.: US 11,822,297 B2
(45) Date of Patent: Nov. 21, 2023

(54) METHOD, DEVICE AND APPARATUS FOR PROCESSING CONTROL PARAMETER, AND STORAGE MEDIUM

(71) Applicant: Baidu Online Network Technology (Beijing) Co., Ltd., Beijing (CN)

(72) Inventors: Dingfeng Guo, Beijing (CN); Xiao Cui, Beijing (CN); Zhenguang Zhu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 82 days.

(21) Appl. No.: 16/786,440

(22) Filed: Feb. 10, 2020

(65) Prior Publication Data
US 2020/0264570 A1      Aug. 20, 2020

(30) Foreign Application Priority Data
Feb. 19, 2019   (CN) .......................... 201910123172.0

(51) Int. Cl.
*G05B 13/04*       (2006.01)
*G05B 6/02*        (2006.01)
(Continued)

(52) U.S. Cl.
CPC ............ *G05B 13/042* (2013.01); *G05B 6/02* (2013.01); *B60W 50/10* (2013.01);
(Continued)

(58) Field of Classification Search
CPC ...... G05B 13/042; G05B 6/02; G05B 13/048; G05B 11/42; B60W 2552/40;
(Continued)

(56) References Cited

U.S. PATENT DOCUMENTS

| | | | |
|---|---|---|---|
| 10,338,539 B1 * | 7/2019 | Avritch | G05D 19/02 |
| 2002/0040250 A1 * | 4/2002 | Gaikwad | G05B 11/42 |
| | | | 700/37 |

(Continued)

FOREIGN PATENT DOCUMENTS

| | | |
|---|---|---|
| CN | 1839356 A | 9/2006 |
| CN | 102427326 A | 4/2012 |

(Continued)

OTHER PUBLICATIONS

Extended European Search Report in European Patent Application No. 201576238, dated Jul. 10, 2020 (6 pages).

(Continued)

*Primary Examiner* — Kenneth M Lo
*Assistant Examiner* — Mohammed Shafayet
(74) *Attorney, Agent, or Firm* — BENESCH, FRIEDLANDER, COPLAN & ARONOFF LLP

(57) ABSTRACT

A method, device and apparatus for processing a control parameter, and a storage medium are provided. The method includes: acquiring first information input to a control system; acquiring second information output after the first information is processed by the control system; obtaining a first parameter characteristic for characterizing a system parameter, according to the first information and the second information; obtaining a second parameter characteristic for adjusting the control parameter, according to the first parameter characteristic and a corresponding relation between the system parameter and the control parameter; and adjusting the control parameter according to the second parameter characteristic. Thus, an adaptive adjustment of the control parameter based on the variation of the scene is realized, and the parameter adjustment efficiency is improved.

14 Claims, 3 Drawing Sheets

(51) Int. Cl.
*B60W 50/10* (2012.01)
*G05D 1/02* (2020.01)

(52) U.S. Cl.
CPC ..... *B60W 2540/10* (2013.01); *B60W 2540/12* (2013.01); *B60W 2540/18* (2013.01); *B60W 2552/40* (2020.02); *B60W 2710/18* (2013.01); *B60W 2710/20* (2013.01); *B60W 2720/10* (2013.01); *G05D 1/0223* (2013.01); *G05D 2201/0213* (2013.01)

(58) Field of Classification Search
CPC ............ B60W 50/10; B60W 2540/10; B60W 2540/12; B60W 2540/18; B60W 2710/18; B60W 2710/20; B60W 2720/10; G05D 1/0223; G05D 2201/0213
USPC ........................................................... 700/37
See application file for complete search history.

(56) References Cited

U.S. PATENT DOCUMENTS

| | | | | |
|---|---|---|---|---|
| 2009/0319060 | A1* | 12/2009 | Wojsznis | G05B 17/02 700/30 |
| 2010/0204808 | A1* | 8/2010 | Thiele | G05B 17/02 700/30 |
| 2013/0317647 | A1 | 11/2013 | Okazaki et al. | |
| 2016/0129934 | A1* | 5/2016 | Akatsuka | B62D 15/025 180/446 |
| 2017/0023075 | A1* | 1/2017 | Nozu | B60K 17/35 |
| 2017/0306870 | A1* | 10/2017 | Oh | F02D 41/0052 |
| 2018/0187608 | A1* | 7/2018 | Thazhathil Koyampurath | F02C 9/00 |
| 2018/0275696 | A1 | 9/2018 | North et al. | |
| 2021/0061348 | A1* | 3/2021 | Araki | B62D 9/02 |
| 2021/0188344 | A1* | 6/2021 | Moulaire | B62D 5/006 |

FOREIGN PATENT DOCUMENTS

| | | |
|---|---|---|
| CN | 102466412 A | 5/2012 |
| CN | 106575102 A | 4/2017 |
| CN | 106773647 A | 5/2017 |
| CN | 107077106 A | 8/2017 |
| EP | 2752719 A1 | 7/2014 |
| JP | 2011003186 A | 1/2011 |
| JP | WO2013024571 A1 | 3/2015 |
| JP | 2017167663 A | 9/2017 |
| JP | 2019502582 A | 1/2019 |
| TW | I564683 B | 1/2017 |
| WO | 2013031082 A1 | 3/2013 |

OTHER PUBLICATIONS

Notice of Reasons for Refusal issued by the Japennse Patent Office in Japanese Patent Application No. 2020-022100, dated Feb. 19, 2021 (5 pages).
First Office Action issued by The State Intellectual Property Office of People's Republic of China in Chinese application No. 2019101231720, dated Jul. 16, 2021 (9 pages).
Search Report issued by The China National Intellectual Property Administration in Chinese Application No. 2019101231720, dated Jul. 8, 2021 (5 pages).
Chen, Pengzhan et al., "Research on Speed Control Parameters' Auto-tuning Methods of Servo System", Instrument Technique and Senor, vol. 2, Published Feb. 15, 2010, 4 pages.
Supplementary Search Report and Decision to Grant dated Apr. 2, 2022 for Chinese Application No. 201910123172.0, 7 pages.

* cited by examiner

METHOD, DEVICE AND APPARATUS FOR PROCESSING CONTROL PARAMETER, AND STORAGE MEDIUM

CROSS-REFERENCE TO RELATED APPLICATION

This application claims priority to Chinese Patent Application No. 201910123172.0, filed on Feb. 19, 2019, which is hereby incorporated by reference in its entirety.

TECHNICAL FIELD

The technical field relates to the technology of information processing, and particularly to a method, device and apparatus for processing a control parameter, and a storage medium.

BACKGROUND

For a system that performs a control based on a control parameter, a parameter value of the control parameter usually needs to be set based on a scene corresponding to the system. Thus, if the scene varies, the parameter value of the control parameter needs to be reset according to a new scene. Therefore, when there are too many scenes and scene variation conditions, more parameter values suitable for the scenes should be prepared in advance, and the parameter adjustment efficiency is low.

SUMMARY

A method, device and apparatus for processing a control parameter, and a storage medium are provided according to embodiments of the present disclosure, so as to at least solve the above problems in the existing technology.

In a first aspect, a method for processing a control parameter is provided according to an embodiment of the present disclosure, which includes:

acquiring first information input to a control system;

acquiring second information output after the first information is processed by the control system;

obtaining a first parameter characteristic for characterizing a system parameter, according to the first information and the second information;

obtaining a second parameter characteristic for adjusting the control parameter, according to the first parameter characteristic and a corresponding relation between the system parameter and the control parameter; and adjusting the control parameter according to the second parameter characteristic.

In one embodiment, the adjusting the control parameter according to the second parameter characteristic includes:

adjusting the control parameter according to the second parameter characteristic, until the second information obtained based on the adjusted control parameter meets a preset rule.

In one embodiment, after an environmental characteristic of the control system varies, the second information output after processing by the control system does not meet a preset rule; and the obtaining a second parameter characteristic for adjusting the control parameter, according to the first parameter characteristic and a corresponding relation between the system parameter and the control parameter includes:

acquiring a third parameter characteristic of the system parameter before the environmental characteristic varies;

obtaining a parameter variation characteristic according to the third parameter characteristic and the first parameter characteristic; and obtaining the second parameter characteristic for adjusting the control parameter, according to the parameter variation characteristic and the corresponding relation between the system parameter and the control parameter.

In one embodiment, the obtaining a first parameter characteristic for characterizing a system parameter, according to the first information and the second information includes:

obtaining a target interval value of the system parameter according to the first information and the second information.

In one embodiment, the obtaining a second parameter characteristic for adjusting the control parameter, according to the first parameter characteristic and a corresponding relation between the system parameter and the control parameter includes:

obtaining an adjustment interval value of the control parameter according to the target interval value of the system parameter, and the corresponding relation between the control parameter and the system parameter.

In one embodiment, the control parameter characterizes a proportional gain, an integral gain, and a differential gain; and the adjusting the control parameter according to the second parameter characteristic includes:

selecting and adjusting at least one of the proportional gain, the integral gain and the differential gain, according to the second parameter characteristic of the control parameter.

In a second aspect, a device for processing a control parameter is provided according to an embodiment of the present disclosure, which includes:

an information acquisition unit configured to acquire first information input to a control system; and acquire second information output after the first information is processed by the control system;

a calculation unit configured to obtain a first parameter characteristic for characterizing a system parameter, according to the first information and the second information; and obtain a second parameter characteristic for adjusting the control parameter, according to the first parameter characteristic and a corresponding relation between the system parameter and the control parameter; and a parameter adjustment unit configured to adjust the control parameter according to the second parameter characteristic.

In one embodiment, the parameter adjustment unit is further configured to adjust the control parameter according to the second parameter characteristic, until the second information obtained based on the adjusted control parameter meets a preset rule.

In one embodiment, after an environmental characteristic of the control system varies, the second information output after processing by the control system does not meet a preset rule; and the calculation unit is further configured to:

acquire a third parameter characteristic of the system parameter before the environmental characteristic varies;

obtain a parameter variation characteristic according to the third parameter characteristic and the first parameter characteristic; and obtain the second parameter characteristic for adjusting the control parameter, according to the parameter variation characteristic and the corresponding relation between the system parameter and the control parameter.

In one embodiment, the calculation unit is further configured to obtain a target interval value of the system parameter according to the first information and the second information.

In one embodiment, the calculation unit is further configured to obtain an adjustment interval value of the control parameter according to the target interval value of the system parameter, and the corresponding relation between the control parameter and the system parameter.

In one embodiment, the control parameter characterizes a proportional gain, an integral gain, and a differential gain; and the parameter adjustment unit is further configured to select and adjust at least one of the proportional gain, the integral gain and the differential gain, according to the second parameter characteristic of the control parameter.

In a third aspect, an apparatus for processing a control parameter is provided according to an embodiment of the present disclosure, and the functions thereof can be realized by hardware or by executing corresponding software through the hardware. The hardware or the software includes one or more modules corresponding to the above functions.

In a possible implementation, the apparatus structurally includes: a memory configured to store a program supporting the apparatus to perform the above method, and a processor configured to execute the program stored in the memory. The apparatus may further include a communication interface configured to communicate with another device or a communication network.

In a fourth aspect, a computer readable storage medium is provided according to an embodiment of the present disclosure, which stores computer software instructions used by an apparatus for processing a control parameter, and the storage medium includes a program involved in performing the above method.

One of the above technical solutions has the following advantages or beneficial effects:

the first information input to the control system is acquired; the second information output after the first information is processed by the control system is acquired; the first parameter characteristic for characterizing the system parameter is obtained according to the first information and the second information; the second parameter characteristic for adjusting the control parameter is obtained according to the first parameter characteristic and the corresponding relation between the system parameter and the control parameter; and then the control parameter is adjusted according to the second parameter characteristic, so that the control parameter can be adaptively adjusted at least based on the parameter characteristic of the system parameter, thus realizing the adaptive adjustment of the control parameter based on the variation of the scene, and improving the parameter adjustment efficiency.

The above summary is for the purpose of description only, and is not intended to be limiting in any way. In addition to the illustrative aspects, embodiments and features described above, further aspects, embodiments and features of the present disclosure will be readily apparent with reference to the drawings and the following detailed descriptions.

BRIEF DESCRIPTION OF THE DRAWINGS

In the drawings, unless otherwise specified, the same reference numeral refers to the same or similar parts or elements throughout the drawings. These drawings are not necessarily drawn to scale. It should be understood that these drawings depict only some embodiments disclosed in accordance with the present disclosure and should not be considered as limitations to the scope of the present disclosure.

DETAILED DESCRIPTION OF THE EMBODIMENTS

In the following, certain embodiments are briefly described. As will be recognized by persons skilled in the art, the described embodiments can be modified in a variety of different ways without departing from the spirit or scope of the present disclosure. Accordingly, the drawings and descriptions are regarded as illustrative in nature rather than restrictive.

In the existing technology, for a system that performs a control based on a control parameter, usually the control parameter is preset. Thus, if the same control parameter is adopted after a scene corresponding to the system varies, an output result will not meet an expectation. Therefore, when the scene varies, the control parameter should be reset based on the varied scene to ensure that the output meets the expectation. In other words, the existing methods cannot adaptively adjust the control parameter according to the variation of the scene, resulting in that too many parameter values need to be prepared in advance, the parameter adjustment is difficult and the parameter adjustment efficiency is low.

In order to solve the above problems, a method, device and apparatus for processing a control parameter, and a storage medium are provided according to embodiments of the present disclosure, so as to at least enable the control parameter to be adaptively adjusted based on the variation of the scene, thus improving the parameter adjustment efficiency.

Figure 1:
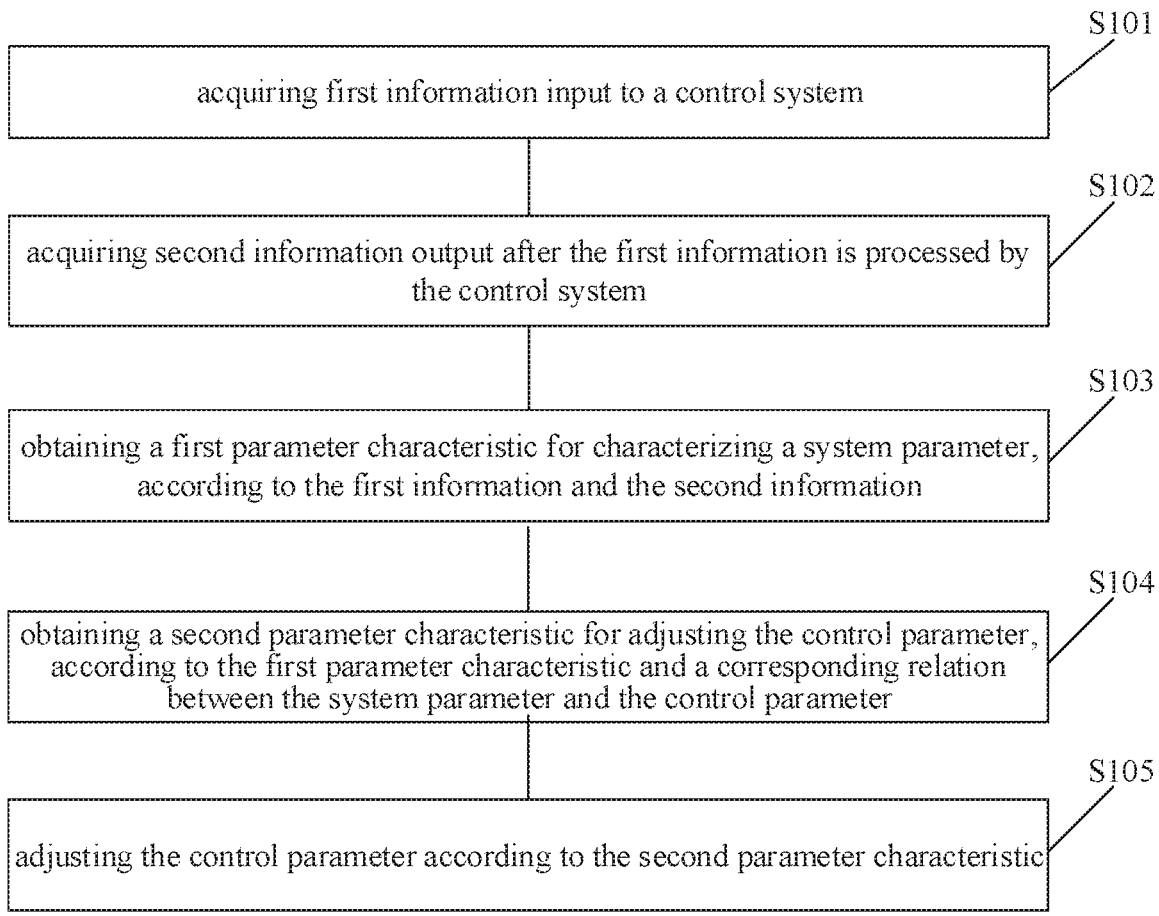
FIG. 1 illustrates a flowchart of a method for processing a control parameter according to an embodiment of the present disclosure.

FIG. 1 illustrates a flowchart of a method for processing a control parameter according to an embodiment of the present disclosure. As illustrated in FIG. 1, the method includes:

S101: acquiring first information input to a control system; and

S102: acquiring second information output after the first information is processed by the control system.

Figure 2:
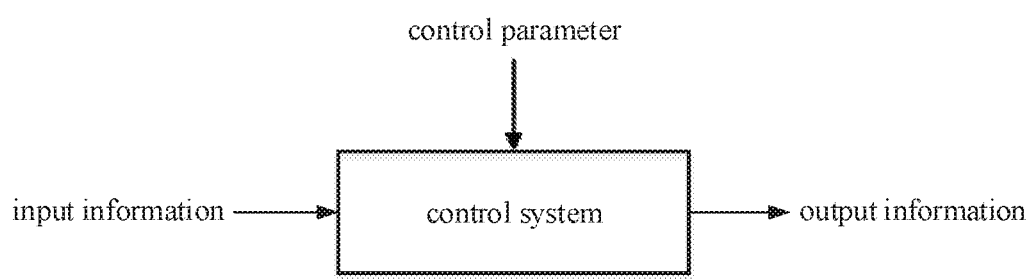
FIG. 2 illustrates a flowchart of a method for processing a control parameter according to an embodiment of the present disclosure.

In a specific example, the first information is input information for the control system, and the second information is output information for the control system, i.e., output information obtained after processing by the control system. Here, the control system is controlled by the control parameter, so that the second information varies with the control parameter. That is, as illustrated in FIG. 2, the control system can adjust a processing of the input information based on a variation of the parameter value of the control parameter, so that the output information varies accordingly. Further, parameters in the control system further include a system parameter, and a parameter relation characterized by the control system described in the embodiments of the present disclosure at least includes a corresponding relation between the control parameter and the system parameter.

In one embodiment, the control parameter characterizes a proportional gain (P), an integral gain (I), and a differential gain (D), i.e., PID parameter. At this time, the control system can characterize a corresponding relation between the system parameter and the PID parameter.

In one embodiment, a specific mathematical algorithm may be adopted to process the first information and the second information to obtain a parameter characteristic for characterizing the system parameter. For example, the first information and the second information may be processed using the least square method to obtain the parameter value of the system parameter.

As illustrated in FIG. 1, the method further includes:

S103: obtaining a first parameter characteristic for characterizing a system parameter, according to the first information and the second information;

S104: obtaining a second parameter characteristic for adjusting the control parameter, according to the first parameter characteristic and a corresponding relation between the system parameter and the control parameter; and S105: adjusting the control parameter according to the second parameter characteristic.

In one embodiment, the control parameter characterizes a proportional gain (P), an integral gain (I), and a differential gain (D), i.e., PID parameter. Further, S105 specifically includes: selecting and adjusting at least one of a proportional gain (P), an integral gain (I) and a differential gain (D), according to the second parameter characteristic of the control parameter. In one parameter adjustment, only a part of the control parameter may need to be adjusted. For example, only the proportional gain (P) or the integral gain (I) may need to be adjusted. In implementation applications, the selection and adjustment can be made according to the implementation requirement, such as a specific preset rule that the output information should meet.

In another embodiment, S105 may specifically include: adjusting the control parameter according to the second parameter characteristic, until the second information obtained based on the adjusted control parameter meets a preset rule. That is, the control parameter is adjusted based on the second parameter characteristic, to realize an adaptive adjustment of the control parameter at least based on the first parameter characteristic of the system parameter, so that the output information obtained based on the adjusted control parameter meets the preset rule. In this way, in practical applications, the system parameter varies with the scene corresponding to the control system, and the control parameter varies with the parameter value of the system parameter, thus achieving the purpose of an adaptive adjustment of the control parameter along with the variation of the scene. In this way, the problems that the control parameter in the existing art needs to be preset according to the scene and cannot be adjusted adaptively are solved, thus improving the adjustment efficiency of the control parameter, and laying a foundation for enriching the application scenes.

In one embodiment, after an environmental characteristic of the control system varies, the second information output after processing by the control system does not meet a preset rule. At this time, S104 may specifically include: acquiring a third parameter characteristic of the system parameter before the environmental characteristic varies; obtaining a parameter variation characteristic according to the third parameter characteristic and the first parameter characteristic; obtaining the second parameter characteristic for adjusting the control parameter, according to the parameter variation characteristic and the corresponding relation between the system parameter and the control parameter.

Figure 3:
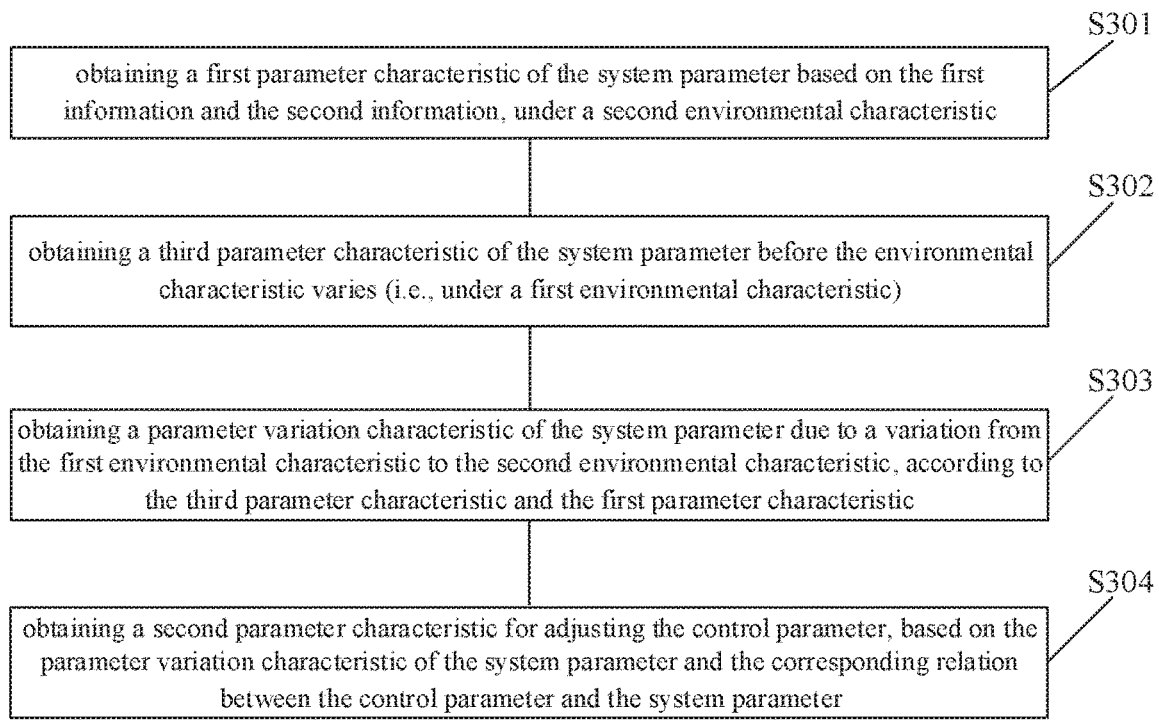
FIG. 3 illustrates a flowchart of a method for processing a control parameter according to an embodiment of the present disclosure.

For example, the control system controls a target apparatus. Here, the target apparatus may be a self-driving automobile, an unmanned aerial vehicle, an unmanned apparatus, etc. The output information obtained by processing the input information with the control system under a first environmental characteristic meets the preset rule. At this time, after the target apparatus controlled by the control system undergoes a variation from the first environmental characteristic to a second environmental characteristic, the output information obtained by processing the input information with the control system does not meet the preset rule. For example, when a state of the target device itself or the corresponding scene varies, the parameter value of the system parameter of the control system will vary correspondingly, but the parameter value of the control parameter do not vary. At this time, the output information does not meet the preset rule. Therefore, the control parameter should be adjusted adaptively to make the output information meet the preset rules. As illustrated in FIG. 3, the adjustment process may include:

S301: obtaining a first parameter characteristic of the system parameter based on the first information and the second information, under a second environmental characteristic;

S302: obtaining a third parameter characteristic of the system parameter before the environmental characteristic varies (i.e., under a first environmental characteristic);

S303: obtaining a parameter variation characteristic of the system parameter due to a variation from the first environmental characteristic to the second environmental characteristic, according to the third parameter characteristic and the first parameter characteristic; and S304: obtaining a second parameter characteristic (for example, a parameter adjustment characteristic) for adjusting the control parameter, based on the parameter variation characteristic of the system parameter and the corresponding relation between the control parameter and the system parameter, so that the control parameter of the control system under the second environmental characteristic are adaptively adjusted based on the second parameter characteristic, until the output information obtained by the control system after adjustment meets the preset rule.

That is, the parameter value of the system parameter under the first environmental characteristic are obtained. For example, the first environmental characteristic characterizes the characteristic information corresponding to the target device when the target device is under a specific environment. At this time, the parameter value of the system parameter under the first environmental characteristic is a known value. After the target device undergoes a variation from the first environmental characteristic to the second environmental characteristic, the parameter value of the system parameter under the second environmental characteristic is calculated based on the input information and the output information, so as to obtain a parameter variation characteristic (e.g., a variation interval of the parameter value) of the system parameter after the variation from the first environmental characteristic to the second environmental characteristic. Finally, the second parameter characteristic (e.g., an adjustment interval value) of the control parameter is obtained based on the parameter variation characteristic of the system parameter and the corresponding relation between the control parameter and the system parameter, and then the control parameter is adjusted, so that the control parameter of the control system under the second environmental characteristic is adaptively adjusted based on the parameter adjustment characteristic, until the output information obtained by processing the input information with the control system meets the preset rule.

Here, the first environmental characteristic characterizes device characteristic information and/or environmental characteristic information of the target device under a first environment; and the second environmental characteristic characterizes device characteristic information and/or environmental characteristic information of the target device under a second environment. The first environment characteristic is different from the second environment characteristic. Further, the input information and the output information are input and output information under the second environmental characteristic.

In another embodiment, the first parameter characteristic may be an interval value. Specifically, S103 may include: obtaining a target interval value of the system parameter according to the first information and the second information. S104 may include: obtaining an adjustment interval value of the control parameter according to the target interval value of the system parameter, and the corresponding relation between the control parameter and the system parameter.

Figure 4:
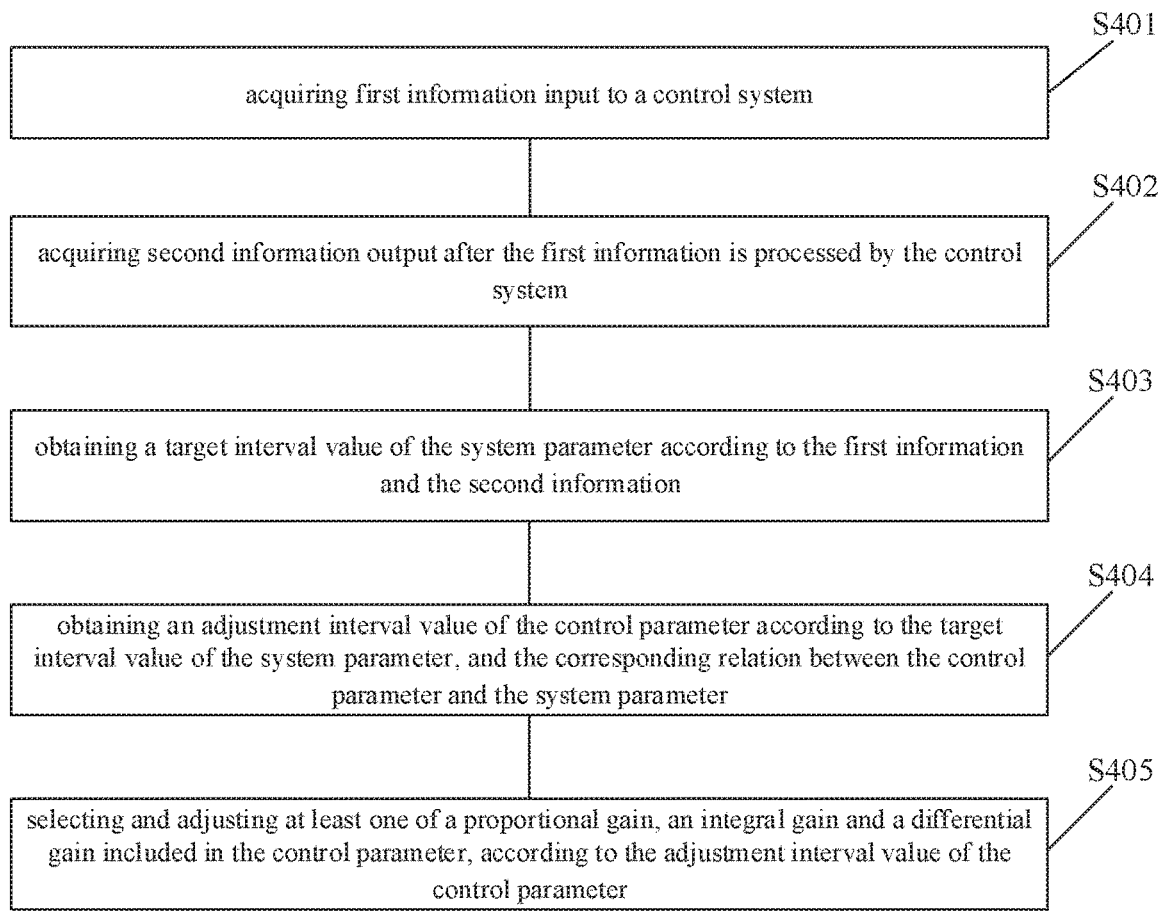
FIG. 4 illustrates a flowchart of a method fir processing a control parameter according to an embodiment of the present disclosure.

For example, as illustrated in FIG. 4, the method according to the embodiment of the present disclosure includes:

S401: acquiring first information input to a control system;

S402: acquiring second information output after the first information is processed by the control system;

S403: obtaining a target interval value of the system parameter according to the first information and the second information;

S404: obtaining an adjustment interval value of the control parameter according to the target interval value of the system parameter, and the corresponding relation between the control parameter and the system parameter; and

S405: selecting and adjusting at least one of a proportional gain, an integral gain and a differential gain included in the control parameter, according to the adjustment interval value of the control parameter.

Of course, in practical applications, the parameter characteristic may be a specific value, and correspondingly, the parameter adjustment characteristic may also be a specific value, which should not be limited in this embodiment.

Next, the method described in the embodiment of the present disclosure will be further explained through specific application scenes. Specifically, the adaptive technique of the modem control theory and the classical PID control algorithm are combined to realize an adaptive adjustment process of the control parameter. The specific solution is as follows:

Firstly, a corresponding relation between the control parameter and the system parameter is determined according to a model corresponding to the control system.

Secondly, the parameter value of the system parameter in the control system is determined by monitoring the input and the output of the control system in real time (the input and the output are known).

Here, for example, the control system is an automatic driving system. At this time, the input may include an accelerator pedal characteristic value, a brake pedal characteristic value, a steering wheel angle, etc. Correspondingly, the output may include a vehicle speed, an acceleration, an accelerator/brake pedal proportion, a wheel edge torque, etc. After the input and the output are determined, the least square method is adopted to obtain the parameter value of the system parameter of the automatic driving system, e.g., a range value of a vehicle load, a road surface friction characteristic value or the like is determined.

Finally, the control parameter is adaptively adjusted based on the parameter value of the system parameter and the corresponding relation between the control parameter and the system parameter, so that the output after the parameter adjustment meets the expectation. Specifically, after the variation interval of the system parameter is determined, the variation interval of the control parameter is also determined. The control parameter is valued within the variation interval, and then the monitoring of the output and input are continued, and the iteration is continuously performed, until the output meets the expectation. At this time, an optimal parameter value or an optimal parameter interval of the control parameter is obtained.

Here, in practical applications, the adjustment range of the PID parameter may also be controlled according to the actual needs, so that the PID parameter can be adjusted adaptively within a preset range, and the autonomous vehicle or the unmanned vehicle can be ensured to travel smoothly and stably in most scenes.

In practical applications, the method described in the embodiment of the present disclosure can be applied to an automobile longitudinal dynamics system which adopts an automobile longitudinal dynamics model characterizing the corresponding relation between the system parameter and the control parameter. Of course, the method described in the embodiment of the present disclosure can also he applied to another parameter sensitive system to adjust the control parameter, which should not be limited in this embodiment.

In this way, the first information input to the control system is acquired; the second information obtained by processing the first information and output from the control system is acquired; the first parameter characteristic for characterizing the system parameter is obtained according to the first information and the second information; the second parameter characteristic for adjusting the control parameter is obtained according to the first parameter characteristic and the corresponding relation between the system parameter and the control parameter; and then the control parameter is adjusted according to the second parameter characteristic, so that the control parameter can be adaptively adjusted at least based on the parameter characteristic of the system parameter, thus realizing the adaptive adjustment of the control parameter based on the variation of the scene, and improving the parameter adjustment efficiency.

In addition, since the system parameter is directly determined based on the first information and the second information, and the control parameter is adjusted based on the parameter value of the system parameter, the method described in this embodiment can be applied to the real-time adjustment scene, thus achieving the purpose of real-time adjustment, and further laying a foundation for enriching the application scenes.

Figure 5:
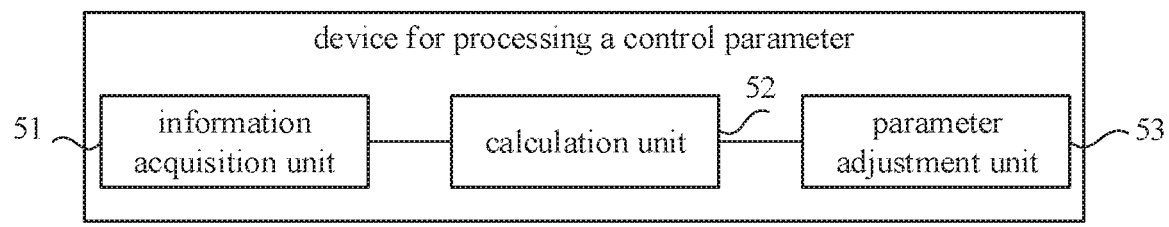
FIG. 5 illustrates a structural block diagram of a device processing a control parameter according to an embodiment of the present disclosure.

A device for processing a control parameter is further provided according to an embodiment of the present disclosure. As illustrated in FIG. 5, the device includes:

an information acquisition unit 51 configured to acquire first information input to a control system; and acquire second information output after the first information is processed by the control system;

a calculation unit 52 configured to obtain a first parameter characteristic for characterizing a system parameter, according to the first information and the second information; and obtain a second parameter characteristic for adjusting the control parameter, according to the first parameter characteristic and a corresponding relation between the system parameter and the control parameter; and a parameter adjustment unit 53 configured to adjust the control parameter according to the second parameter characteristic.

In one embodiment, the parameter adjustment unit 53 is further configured to adjust the control parameter according to the second parameter characteristic, until the second information obtained based on the adjusted control parameter meets a preset rule.

In another embodiment, after an environmental characteristic of the control system varies, the second information output after processing by the control system does not meet a preset rule; and the calculation unit 52 may be further configured to:

acquire a third parameter characteristic of the system parameter before the environmental characteristic varies;

obtain a parameter variation characteristic according to the third parameter characteristic and the first parameter characteristic; and obtain the second parameter characteristic for adjusting the control parameter, according to the parameter variation characteristic and the corresponding relation between the system parameter and the control parameter.

In another embodiment, the calculation unit 52 is further configured to obtain a target interval value of the system parameter according to the first information and the second information.

In another embodiment, the calculation unit 52 is further configured to obtain an adjustment interval value of the control parameter according to the target interval value of the system parameter, and the corresponding relation between the control parameter and the system parameter.

In another embodiment, the control parameter characterizes a proportional gain, an integral gain, and a differential gain. The parameter adjustment unit 53 is further configured to select and adjust at least one of the proportional gain, the integral gain, and the differential gain, according to the second parameter characteristic of the control parameter.

The functions of various modules in the device according to the embodiment of the present disclosure can refer to the corresponding descriptions of the above method, and they will not be repeated here.

Figure 6:
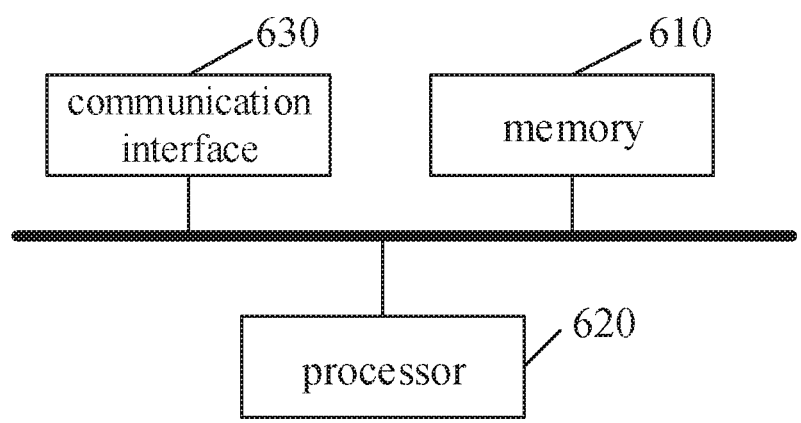
FIG. 6 illustrates a structural block diagram of an apparatus for processing a control parameter according to an embodiment of the present disclosure.

FIG. 6 illustrates a structural block diagram of an apparatus for processing a control parameter according to an embodiment of the present disclosure. As illustrated in FIG. 6, the apparatus includes: a memory 610 and a processor 620, wherein a computer program executable on the processor 620 is stored in the memory 610. When the processor 620 executes the computer program, the method in the above embodiments is implemented. There may be one or more memories 610 and one or more processors 620.

The apparatus further includes:

a communication interface 630 configured to communicate with an external device for a data interactive transmission.

The memory 610 may include a high-speed random access memory (RAM), and may also include a non-volatile memory, such as at least one disk memory.

If being implemented independently, the memory 610, the processor 620 and the communication interface 630 may be connected to each other through a bus and perform communications with each other. The bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, etc. For the convenience of representation, a single thick line is used in FIG. 6, but it does not mean that there is a single bus or one type of bus.

Alternatively, during implementation, if being integrated onto one chip, the memory 610, the processor 620 and the communication interface 630 can perform communications with each other through internal interfaces.

A computer readable storage medium is provided according to an embodiment of the present disclosure, which stores a computer program. The computer program implements the method according to any one of the above embodiments when being executed by a processor.

Among the descriptions herein, a description referring to terms 'one embodiment', 'some embodiments', 'example', 'specific example', 'some examples', or the like means that specific features, structures, materials, or characteristics described in conjunction with the embodiment(s) or example(s) are included in at least one embodiment or example of the present disclosure. Moreover, the specific features, structures, materials, or characteristics described may be incorporated in any one or more embodiments or examples in a suitable manner. In addition, persons skilled in the art may incorporate and combine different embodiments or examples described herein and the features thereof without a contradiction therebetween.

In addition, the terms 'first' and 'second' are used for descriptive purposes only and cannot be understood as indicating or implying a relative importance or implicitly pointing out the number of the technical features indicated. Thus, the features defined with 'first' and 'second' may explicitly or implicitly include at least one of the features. In the description of the present disclosure, 'a (the) plurality of' means 'two or more', unless otherwise specified explicitly.

Any process or method description in the flowchart or otherwise described herein may be understood to mean a module, a segment, or a part including codes of executable instructions of one or more steps for implementing a specific logical function or process, and the scope of preferred embodiments of the present disclosure includes additional implementations, wherein the functions may be performed without in a sequence illustrated or discussed, including being performed in a substantially simultaneous manner according to the functions involved or in a reverse sequence, which should be understood by skilled persons in the technical field to which the embodiments of the present disclosure belong.

At least one of the logics and the steps represented in the flowchart or otherwise described herein, for example, may be considered as a sequencing list of executable instructions for implementing logical functions, and may be embodied in any computer readable medium for being used by or in conjunction with an instruction execution system, a device or an apparatus (e.g., a computer-based system, a system including a processor, or any other system capable of fetching and executing instructions from the instruction execution system, the device, or the apparatus). Regarding this specification, the 'computer readable medium' may be any means that can contain, store, communicate, propagate, or transfer a program for being used by or in conjunction with the instruction execution system, the device, or the apparatus. More specific examples (non-exhaustive list) of the computer readable medium include an electrical connection portion (electronic device) having one or more wires, a portable computer enclosure (magnetic device), a random access memory (RAM), a read only memory (ROM), an erasable editable read only memory (EPROM or flash memory), an optical fiber device, and a portable read only memory (CDROM). In addition, the computer readable medium may even be paper or any other suitable medium on which the program is printed, because the program can be electronically obtained, for example, by optically scanning the paper or other medium, and editing, interpreting, or processing in other suitable ways if necessary, and then stored in a computer memory.

It should be understood that various parts of the present disclosure may be implemented by hardware, software, firmware, or combinations thereof. In the above embodiments, a plurality of steps or methods may be implemented by software or firmware stored in a memory and executed with a suitable instruction execution system. For example, if hardware is employed for implementation, like in another embodiment, the implementation may be made by any one or combinations of the following technologies known in the art: a discreet logic circuit having a logic gate circuit for implementing logic functions on data signals, an application specific integrated circuit having an appropriate combinational logic gate circuit, a programmable gate array (PGA), a field programmable gate array (FPGA), etc.

Persons of ordinary skill in the art can understand that all or part of the steps carried by the above method embodiments can be implemented by instructing relevant hardware through a program, wherein the program may be stored in a computer readable storage medium, and it includes one or combinations of the steps of the method embodiments when being executed.

In addition, the functional units in various embodiments of the present disclosure may be integrated into one processing module, or may be physically presented separately, or two or more units may be integrated into one module. The above integrated module may be implemented in the form of one of hardware and a software functional module. If the integrated module is implemented in the form of a. software functional module and sold or used as an independent product, it may also be stored in a computer readable storage medium that may be a read only memory, a magnetic disk or an optical disk, etc.

Those described above are only embodiments of the present disclosure, but the protection scope of the present disclosure is not limited thereto. Within the technical scope revealed in the present disclosure, any skilled person familiar with the technical field can easily conceive of various varies or replacements thereof, which should be covered by the protection scope of the present disclosure. Therefore, the protection scope of the present disclosure should be subject to that of the accompanied claims.

The invention claimed is:

1. A method for processing a control parameter, comprising:
    acquiring first information input to a control system;
    acquiring second information output by the control system after the first information is processed by the control system;
    obtaining a first parameter characteristic for characterizing a system parameter according to the first information and the second information, wherein the system parameter varies with a scene corresponding to the control system, and the first parameter characteristic for characterizing the system parameter includes a range value of a vehicle load or a road surface friction characteristic value;
    obtaining a second parameter characteristic for adjusting the control parameter according to the first parameter characteristic and a corresponding relation between the system parameter and the control parameter, wherein the control parameter characterizes a proportional gain, an integral gain, and a differential gain; and
    adjusting the control parameter within a preset range according to the second parameter characteristic, until the second information obtained by the control system based on the adjusted control parameter meets a preset rule, wherein the adjusting the control parameter within the preset range according to the second parameter characteristic comprises:
    selecting at least one of the proportional gain, the integral gain and the differential gain of the control parameter, and adjusting the at least one of the proportional gain, the integral gain and the differential gain within the preset range according to the second parameter characteristic.

2. The method according to claim 1, wherein after an environmental characteristic of the control system varies, the second information output after processing by the control system does not meet the preset rule, and
    wherein the obtaining the second parameter characteristic for adjusting the control parameter according to the first parameter characteristic and the corresponding relation between the system parameter and the control parameter comprises:
    acquiring a third parameter characteristic of the system parameter before the environmental characteristic varies;
    obtaining a parameter variation characteristic according to the third parameter characteristic and the first parameter characteristic; and
    obtaining the second parameter characteristic for adjusting the control parameter according to the parameter variation characteristic and the corresponding relation between the system parameter and the control parameter.

3. The method according to claim 1, wherein the obtaining the first parameter characteristic for characterizing the system parameter according to the first information and the second information comprises:
    obtaining a target interval value of the system parameter according to the first information and the second information.

4. The method according to claim 3, wherein the obtaining the second parameter characteristic for adjusting the control parameter according to the first parameter characteristic and the corresponding relation between the system parameter and the control parameter comprises:
    obtaining an adjustment interval value of the control parameter according to the target interval value of the system parameter, and the corresponding relation between the control parameter and the system parameter.

5. The method according to claim 1, wherein
    the first information input to the control system includes an accelerator pedal characteristic value, a brake pedal characteristic value, or a steering wheel angle;
    the control system processes the first information to obtain the second information, and the second information output by the control system includes a vehicle speed, an acceleration, an accelerator proportion or brake pedal proportion, or a wheel edge torque.

6. The method according to claim 1, wherein the first information and the second information are processed using a least square method to obtain a parameter value of the system parameter.

7. A device for processing a control parameter, comprising:
one or more processors; and
a storage device configured to store one or more programs, wherein the one or more programs, when executed by the one or more processors, cause the one or more processors to:
acquire first information input to a control system; and acquire second information output by the control system after the first information is processed by the control system;
obtain a first parameter characteristic for characterizing a system parameter according to the first information and the second information, wherein the system parameter varies with a scene corresponding to the control system, and the first parameter characteristic for characterizing the system parameter includes a range value of a vehicle load or a road surface friction characteristic value; and
obtain a second parameter characteristic for adjusting the control parameter according to the first parameter characteristic and a corresponding relation between the system parameter and the control parameter, wherein the control parameter characterizes a proportional gain, an integral gain, and a differential gain; and
adjust the control parameter within a preset range according to the second parameter characteristic, until the second information obtained by the control system based on the adjusted control parameter meets a preset rule,
wherein the one or more programs, when executed by the one or more processors, cause the one or more processors further to select at least one of the proportional gain, the integral gain and the differential gain of the control parameter, and adjust the at least one of the proportional gain, the integral gain and the differential gain within the preset range according to the second parameter characteristic.

8. The device according to claim 7, wherein after an environmental characteristic of the control system varies, the second information output after processing by the control system does not meet the preset rule, and
wherein the one or more programs, when executed by the one or more processors, cause the one or more processors further to:
acquire a third parameter characteristic of the system parameter before the environmental characteristic varies;
obtain a parameter variation characteristic according to the third parameter characteristic and the first parameter characteristic; and
obtain the second parameter characteristic for adjusting the control parameter according to the parameter variation characteristic and the corresponding relation between the system parameter and the control parameter.

9. The device according to claim 7, wherein the one or more programs, when executed by the one or more processors, cause the one or more processors further to obtain a target interval value of the system parameter according to the first information and the second information.

10. The device according to claim 9, wherein the one or more programs, when executed by the one or more processors, cause the one or more processors further to obtain an adjustment interval value of the control parameter according to the target interval value of the system parameter, and the corresponding relation between the control parameter and the system parameter.

11. A non-transitory computer-readable storage medium comprising computer executable instructions stored thereon, wherein the computer executable instructions, when executed by a processor, causes the processor to:
acquire first information input to a control system;
acquire second information output by the control system after the first information is processed by the control system;
obtain a first parameter characteristic for characterizing a system according to the first information and the second information, wherein the system parameter varies with a scene corresponding to the control system, and the first parameter characteristic for characterizing the system parameter includes a range value of a vehicle load or a road surface friction characteristic value;
obtain a second parameter characteristic for adjusting the control parameter according to the first parameter characteristic and a corresponding relation between the system parameter and the control parameter, wherein the control parameter characterizes a proportional gain, an integral gain, and a differential gain; and
adjust the control parameter within a preset range according to the second parameter characteristic, until the second information obtained by the control system based on the adjusted control parameter meets a preset rule,
wherein the computer executable instructions, when executed by the processor, causes the processor further to select at least one of the proportional gain, the integral gain and the differential gain of the control parameter, and adjust the at least one of the proportional gain, the integral gain and the differential gain within the preset range according to the second parameter characteristic.

12. The non-transitory computer-readable storage medium according to claim 11, wherein after an environmental characteristic of the control system varies, the second information output after processing by the control system does not meet the preset rule, and wherein the computer executable instructions, when executed by the processor, causes the processor further to
acquire a third parameter characteristic of the system parameter before the environmental characteristic varies;
obtain a parameter variation characteristic according to the third parameter characteristic and the first parameter characteristic; and
obtain the second parameter characteristic for adjusting the control parameter, according to the parameter variation characteristic and the corresponding relation between the system parameter and the control parameter.

13. The non-transitory computer-readable storage medium according to claim 11, wherein the computer executable instructions, when executed by the processor, causes the processor further to obtain a target interval value of the system parameter according to the first information and the second information.

14. The non-transitory computer-readable storage medium according to claim 13, wherein the computer executable instructions, when executed by the processor, causes the processor further to obtain an adjustment interval value of the control parameter according to the target interval value of the system parameter, and the corresponding relation between the control parameter and the system parameter.

\* \* \* \* \*